(12) United States Patent
Appel et al.

(10) Patent No.: US 7,503,219 B2
(45) Date of Patent: Mar. 17, 2009

(54) MONITORING AND DIAGNOSING A TECHNICAL INSTALLATION USING PURELY MECHANICALLY ACTIVATED SIGNALING MEANS

(75) Inventors: Mirko Appel, München (DE); Wolfgang Fick, München (DE); Uwe Gerk, Frensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 180 days.

(21) Appl. No.: 10/528,318

(22) PCT Filed: Oct. 23, 2002

(86) PCT No.: PCT/EP02/11867

§ 371 (c)(1),
(2), (4) Date: Mar. 17, 2005

(87) PCT Pub. No.: WO2004/029563

PCT Pub. Date: Apr. 8, 2004

(65) Prior Publication Data

US 2005/0237181 A1    Oct. 27, 2005

(30) Foreign Application Priority Data

Sep. 26, 2002    (EP)    .................... 02021498

(51) Int. Cl.
*G01D 21/00*    (2006.01)
(52) U.S. Cl. ......................... 73/651; 73/579
(58) Field of Classification Search ............. 73/651, 73/579
See application file for complete search history.

(56) References Cited

U.S. PATENT DOCUMENTS

| | | | |
|---|---|---|---|
| 1,340,300 A | | 5/1920 | Smiley |
| 1,788,941 A | * | 1/1931 | Thomas et al. ............... 340/682 |
| 3,139,748 A | | 7/1964 | Sturm |
| 3,443,214 A | | 5/1969 | Meservey |
| 3,795,006 A | * | 2/1974 | Engdahl et al. ............... 73/651 |
| 3,972,391 A | * | 8/1976 | Penn ..................... 188/1.11 R |
| 4,091,762 A | * | 5/1978 | Ruehl .......................... 116/70 |
| 4,148,271 A | | 4/1979 | Majernik |
| 4,237,454 A | | 12/1980 | Meyer |
| 4,479,389 A | * | 10/1984 | Anderson et al. ............. 73/651 |
| 4,567,972 A | * | 2/1986 | Buch et al. ............... 192/30 W |
| 4,806,858 A | | 2/1989 | Elbicki |
| 5,001,933 A | * | 3/1991 | Brand ......................... 73/651 |

(Continued)

FOREIGN PATENT DOCUMENTS

EP    0 538 580 A1    4/1993

(Continued)

OTHER PUBLICATIONS

Fritsch et al, "A Low-Frequency Micromechanical Resonant Vibration Sensor for Wear Monitoring", Sensors and Actuators A 62, Jul. 1, 1997, pp. 616-620, vol. 62, No. 1-3, Elsevier Sequoia S.A., Lausanne, CH.

(Continued)

*Primary Examiner*—Hezron Williams
*Assistant Examiner*—Nashmiya S Fayyaz

(57) ABSTRACT

A specific failure occurring during operation of a technical installation is detected by acquiring an acoustic and/or optical signal emitted by a device assigned to at least one component of the technical installation whereby the device is being activated mechanically.

6 Claims, 1 Drawing Sheet

U.S. PATENT DOCUMENTS

| | | | |
|---|---|---|---|
| 5,014,544 A | 5/1991 | West | |
| 5,534,289 A | 7/1996 | Bilder et al. | |
| 5,691,707 A * | 11/1997 | Smith et al. | 340/682 |
| 6,059,500 A | 5/2000 | Dirmeier et al. | |
| 6,138,078 A | 10/2000 | Canada et al. | |
| 6,633,821 B2 * | 10/2003 | Jackson et al. | 702/56 |
| 2002/0000128 A1 | 1/2002 | Williams | |

FOREIGN PATENT DOCUMENTS

| | | |
|---|---|---|
| EP | 0 562 991 A2 | 7/1993 |
| FR | 1 480 268 | 5/1967 |
| GB | 743 687 | 1/1956 |
| GB | 1 313 058 | 4/1973 |
| GB | 1 417 108 | 12/1975 |
| GB | 2 194 062 A | 2/1988 |
| GB | 2 250 785 A | 6/1992 |
| JP | 08318449 A * | 12/1996 |
| JP | 10 090365 A | 4/1998 |
| WO | WO 81/03702 | 12/1981 |

OTHER PUBLICATIONS

R. M. Murcko and J. G. Simek: "Defective Capacitor Indication", May 1979, IBM Technical Disclosure Bulletin, vol. 21, No. 12, May 1, 1979, p. 4807, XP002364391, New York, US.

* cited by examiner

MONITORING AND DIAGNOSING A TECHNICAL INSTALLATION USING PURELY MECHANICALLY ACTIVATED SIGNALING MEANS

CROSS REFERENCE TO RELATED APPLICATION

This application is the US National Stage of International Application No. PCT/EP2002/011867, filed Oct. 23, 2002 and claims the benefit thereof. The International Application claims the benefits of European Patent application No. 02021498.7 EP filed Sep. 26, 2002, both of the applications are incorporated by reference herein in their entirety.

FIELD OF THE INVENTION

The invention relates to a method respectively apparatus for monitoring a technical installation.

BACKGROUND OF THE INVENTION

In industrial plants, especially in power plants, condition monitoring of main systems (e.g. turbines and/or generators) sub-systems (e.g. water-steam-cycle) and components (e.g. pumps, motors, drives, valves, pipes, bearings etc.) of the plants is essential to guarantee reliable operation. Condition monitoring often includes a quasi non-stop acquisition and storing of data relevant for the operation of the plant.

In order to adjust operation parameters during operation of the plant, schedule maintenance and repair work, and to minimize safety risks, accurate data about the condition of numerous plant assets must be gathered and analyzed. The nature of a.m. data needed is manifold and the impact of said data on actual plant failures is often hard to determine.

Typical examples of condition monitoring data are vibration data (e.g. of turbines or pumps, often acquired by vibration sensors and analyzed by a specialized evaluation device using spectrum analysis or the like), temperature and/or pressure data (e.g. of boilers, acquired inside the boiler via sensors or calculated indirectly using related data), volume data (e.g. throughput of a pipeline) and so on.

There are technical means, e.g. sensors, to collect most of the desired data. However, for a complete and reliable picture of a plant's actual condition, the amount of data needed is enormous.

This is a problem both in terms of installation costs of sensors, and in terms of efforts to analyze the resulting sensor data.

As a consequence, the majority of plant owners cannot afford an all-embracing monitoring of all plant assets.

Therefore, unscheduled drop outs of production are inevitable, often resulting in a loss of income and/or high penalties.

Known methods of monitoring the condition of industrial plants may include:

Collecting data and reporting related values, e.g. on-line or off-line statuses, using sensors attached to the components to be monitored; said sensors may include vibration sensors for rotating machinery (e.g. generators, turbines) and/or thermography (e.g. temperature) sensors for boilers.

If a component is being monitored on-line, sensors are usually connected to an evaluation system, which analyzes the data and prompts appropriate messages related to its condition to the operator, e.g. on a computer screen or large screen display.

Off-line sensors do not necessarily need to be connected to an evaluation system; data can be collected on demand, e.g. using a portable computer.

Any kind of known methods of sensor based monitoring are usually extremely costly.

Not only the actual technical equipment needed, but also the appropriate commissioning and adjusting of the sensors to the specific needs and environmental conditions, take more efforts and financial investments than typical plant owners are able or willing to spend.

And/or

Inspecting machinery by frequent walks across the plant.

Specialist engineers may inspect machinery by a.m. frequent "walk downs".

The main "sensor" used for inspection here is human perception.

Due to their knowledge and experience, these engineers are able to detect a broad range of failures.

However, symptoms of many failures simply cannot be sensed without technical aids.

For example, bearings, which start becoming faulty, can only rarely by detected solely by human perception, or the unwanted change of magnetic flux in a pump cannot at all be noticed by man.

Furthermore, long term changes of a machine's characteristic occurring in the course of time are very hard to realize since there no direct comparison available with a regular operation mode.

SUMMARY OF THE INVENTION

It is therefore an object of this invention to provide an improved and affordable method respectively apparatus for monitoring a technical installation, especially for carrying out diagnosis.

A method according to the invention comprises acquiring at least one acoustical and/or optical signal assigned to at least one specific failure of at least one component of the technical installation, whereby said acoustical and/or optical signal is being produced by a device assigned to said component and said device is being activated mechanically in case of occurrence of said failure.

An apparatus according to the invention comprises at least one device assigned to at least one component of the technical installation for producing an acoustical and/or optical signal characteristic for at least one specific failure of said component, whereby said device is activated mechanically in case of occurrence of said failure.

Preferred embodiments of the invention are laid down in several dependant claims.

Any embodiment of the invention may include, but will not be limited to, one or more of the following features.

Sub-systems/machinery components are designed in such a way that they indicate faults acoustically and/or optically.

Instead of attaching sensors to machinery which display measured data on a screen or on legacy computer systems, machinery or components thereof are designed in such a way that faults can clearly be identified by characteristic sounds (acoustical signal) and/or that a machine's components are designed in such a way that they change their outer appearance (optical signal), e.g. with regard to their coating color, when a fault occurs.

Especially the acoustical and/or optical signal is directly activated by the respective failure; e.g. any type of fault may cause a unique sound ("groan"), i.e. the sound's frequency and/or its volume allow identifying the kind of fault without ambiguity ("groaning machinery").

The sounds should be identifiable by personnel without technical aids such as vibration monitoring devices or sound analysis systems.

Alternatively or in combination therewith each type of fault may cause an optical signal assigned to said failure.

This enables a person carrying out a walk across the plant to detect also faults which normally would be not be sensible by human perception.

A monitoring method and/or apparatus according to the invention does not require costly additional sensors since machinery or components thereof by mechanical design make faults obvious for plant personnel by producing characteristic sounds and/or optical signals perceivable by human senses.

Therefore, walks across the plant are much more effective and give a more comprehensive image of a plant's condition without a need for extensive technical diagnosis equipment; without plant-wide sensor installations, plant operators may receive all information for making operational and maintenance decisions.

Examples of plant components designed to be used according to the invention:

Rotating machinery, such as pumps or fans, are designed in such a way that faults in their bearings lead to characteristic noises.

This can be achieved by designing the casing in such a way that faulty bearings result in resonance effects.

Faults in different bearings may result in different resonance frequencies easily detectable and distinguishable by human ears.

Such resonance effects can be made perceivable for example by attaching plates to the casing which vibrate according to body resonance of the casing.

Supports of pipelines are often designed to adjust flexibly when the pipeline expands due to a change of its temperature.

Abnormal temperature changes lead to abnormal adjustment of the support. A characteristic squeaking of the support would make such abnormal temperature changes audible to plant personnel.

Electrical machinery produce well defined electric-magnetic flux.

A flux sensitive coating may change color when the flux differs from the expected flux. Such discrepancies indicate the type of fault inside the machine, i.e. faulty rotors in electrical engines.

Temperature sensitive coatings may change their color and thus reflect discrepancies from normal temperatures of machinery.

An abnormal local temperature in a specific area on a machine's surface may thus give hints to the type and location of a fault.

For example, local temperature discrepancies in a rotating machine can indicate a faulty bearing.

Vessels containing a liquid of noticeable color can be attached to components of a technical installation.

A vessel, its location and way of attachment are designed in such a way that the vessel breaks when the machinery or a particular component thereof suffer excessive strain, for example due to vibration or excessive pressure.

The liquid leaking from the vessel and spilling over at least part of the machine is an optical indication for the (excessive) strain the respective component is or was exposed to.

The advantages of the invention compared to sensor based condition monitoring include cost saving and data reduction.

Machinery designed to indicate faults acoustically and/or optically do not require additional sensors to monitor their status.

Since only faults are reported, e.g. by personnel walking across the plant, and no data are reported on machinery components which works faultlessly, the amount of data to be processed in evaluation and analysis systems is reduced.

BRIEF DESCRIPTION OF THE DRAWINGS

The following figures show preferred embodiments of the invention.

DETAILED DESCRIPTION OF THE INVENTION

Figure 1:
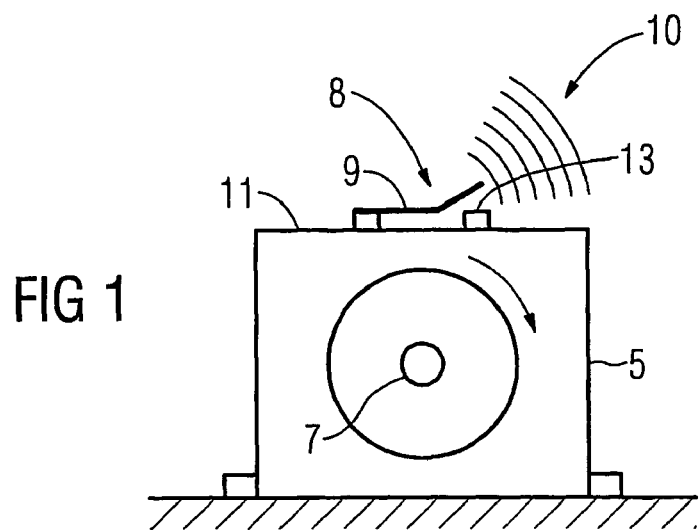
FIG. 1 shows an apparatus according to the invention.

A pump 5 is designed to indicate a faulty pump bearing 7 acoustically.

Therefore, a plate 9 is fixed at a casing 11 of the pump 5 in such a way, that it can vibrate when activated at its resonance frequency, and cause a characteristic noise by hitting e.g. a metal stub 13 on the casing 11.

The plate 9 is designed in such a way that it has the same body resonance frequency as the vibration frequency caused by the bearing 7 getting faulty.

Hence, the faulty bearing 7 causes the plate 9 to vibrate and thus produce a noise characteristic for the faulty bearing 7.

The plate 9 may also be designed to produce a musical note in a special tune when being activated at its resonance frequency by the faulty bearing 7. Concerning that embodiment, the stub 13 may be omitted as the characteristic noise is the vibration of the plate 9 itself.

If there are a number of bearings in a plant, the respective plates may be designed to produce different musical notes so that the plant's personnel can tell by the frequency of the note which bearing is faulty.

Figure 2:
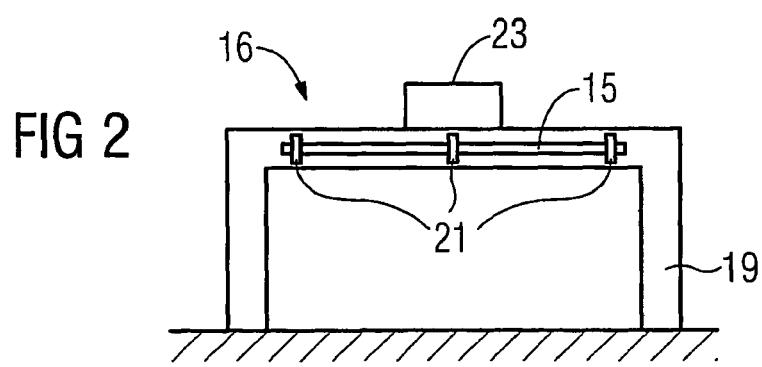
FIGS. 2 and 3 show a vessel, filled with liquid.
Figure 3:
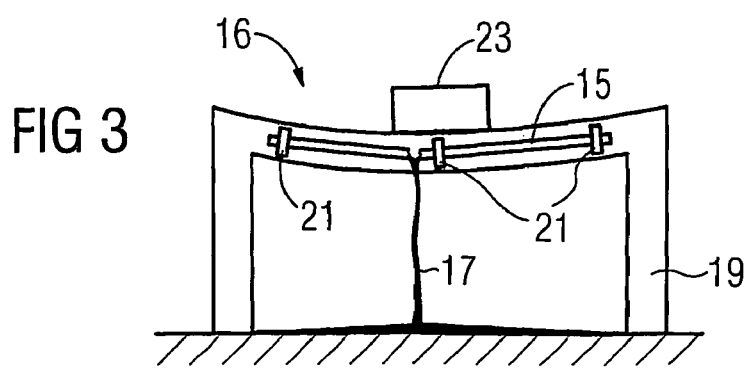

FIGS. 2 and 3 show a vessel 15, filled with liquid 17, which is fixed on a steel construction 19 by three fixations 21 (see FIG. 2).

When the steel construction 19 suffers excessive stress, e.g. by putting a weight 23 on top, the vessel 15 breaks and the liquid 17 inside the vessel 15 spills and thus gives indication for the excessive stress the steel construction 19 has suffered (see FIG. 3).

Using vessels 15 filled with liquids 17 of different colors, which are be designed to break at different stress limits, may give the operating and maintenance personnel of the plant a quick and comprehensive overview which component of the plant has suffered excessive stress and/or the strength of the respective stress burden.

The invention in general may be summarized as follows:

A specific failure occurring during operation of a technical installation is detected by acquiring an acoustic and/or optical signal (10, 14) emitted by a device (9, 15) assigned to at least one component (5, 19) of the technical installation whereby the device (9, 15) is being activated mechanically.

The invention claimed is:

1. An acousto-mechanical method for monitoring and carrying out a diagnosis of a technical installation, comprising:
   uniquely assigning an acoustical signal to a specific failure of a respective one of a plurality of rotatable components of the technical installation;
   mounting a respective vibratory device on each of the plurality of components, wherein the vibratory device is configured to mechanically generate the uniquely assigned acoustic signal in the event the specific failure of a respective one of the plurality of components occurs, providing in each vibratory device a respective plate;

uniquely adapting each plate to resonate at a vibration frequency in correspondence with the uniquely assigned acoustic signal and;

based on a sound characteristic produced by a plate that resonates at the uniquely assigned acoustic signal, uniquely identifying the respective one of the plurality of rotatable components of the technical installation experiencing the failure.

2. The method according to claim 1, wherein a number of devices are provided for a single component or a number of devices are provided for a number of components, each device being assigned to a specific failure.

3. The method according to claim 1, wherein a number of devices are provided for a single component, each device being assigned to a specific failure.

4. An acousto-mechanical apparatus for monitoring and carrying out a diagnosis for a power plant, comprising:

a respective vibratory device mounted on each of a plurality of components of the power plant for mechanically producing a uniquely assigned acoustical signal when a specific failure occurs in a respective one of the plurality of rotatable components of the power plant, each vibratory device including a respective plate, each plate uniquely adapted to resonate at a vibration frequency in correspondence with the uniquely assigned acoustic signal, wherein, based on a sound characteristic produced by a plate that resonates at the uniquely assigned acoustic signal, the device allows a user to uniquely identify the respective one of the plurality of rotatable components of the technical installation experiencing the failure.

5. The apparatus according to claim 4, wherein a number of devices are provided for a single component or a number of devices are provided for a number of components, each device being assigned to a specific failure.

6. The apparatus according to claim 4, wherein a number of devices are provided for a single component, each device being assigned to a specific failure.

* * * * *